Oct. 27, 1936.  E. E. WEMP  2,059,158
CLUTCH
Filed March 19, 1931  2 Sheets-Sheet 1
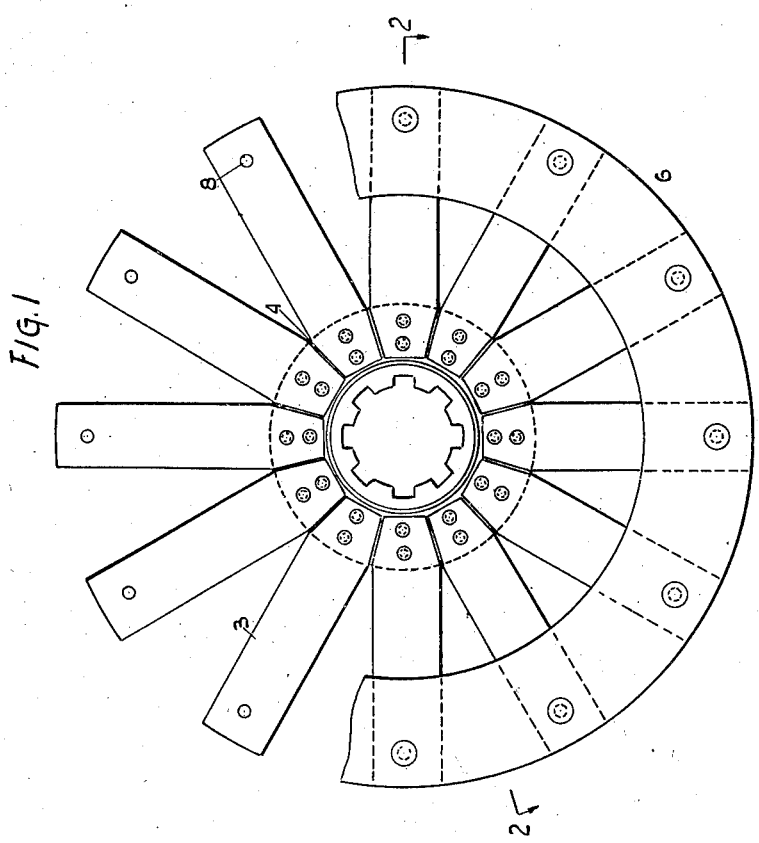
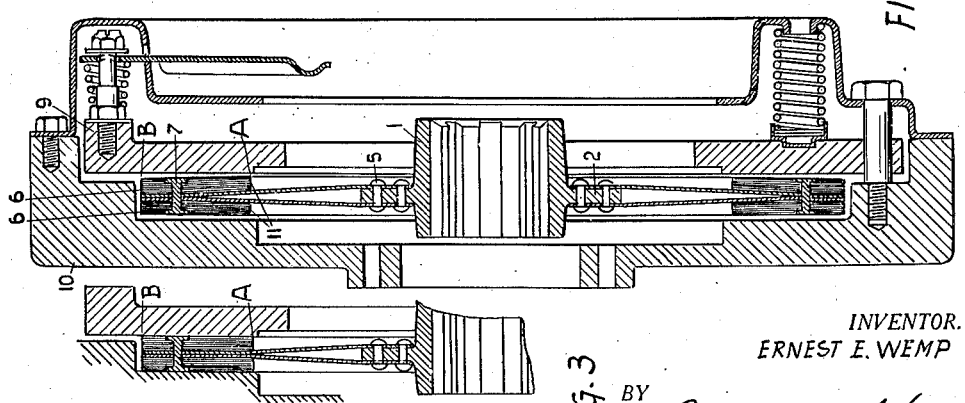
INVENTOR.
ERNEST E. WEMP
BY
Barnes and Kisselle
ATTORNEYS.

Oct. 27, 1936.  E. E. WEMP  2,059,158
CLUTCH
Filed March 19, 1931  2 Sheets-Sheet 2
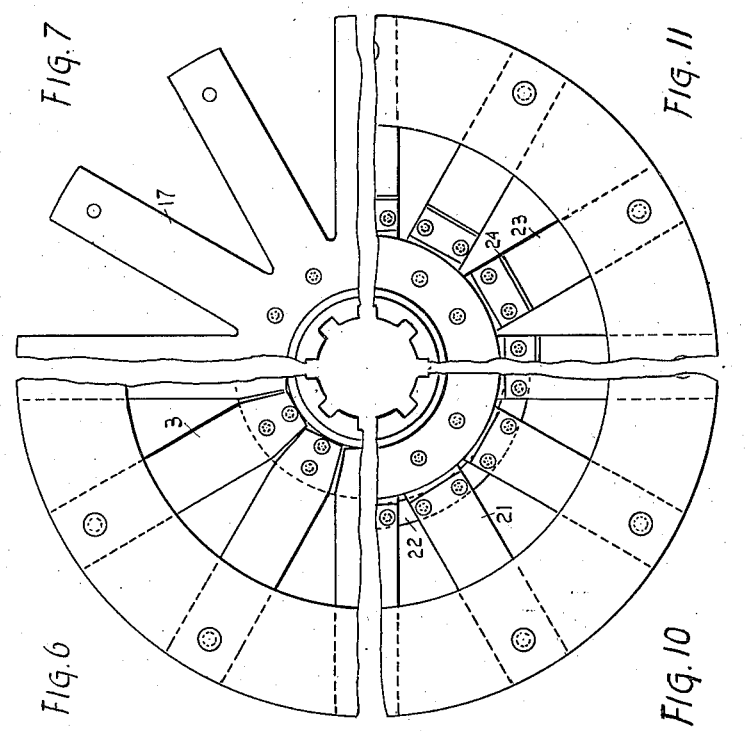
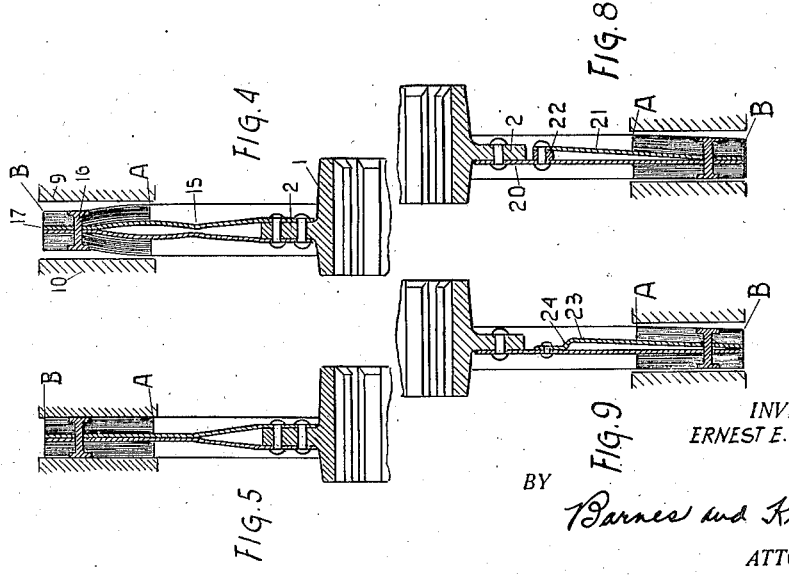
INVENTOR.
ERNEST E. WEMP
BY
Barnes and Kisselle
ATTORNEYS.

Patented Oct. 27, 1936

2,059,158

UNITED STATES PATENT OFFICE 2,059,158

CLUTCH

Ernest E. Wemp, Detroit, Mich.

Application March 19, 1931, Serial No. 523,671

33 Claims. (Cl. 192—107)

REISSUED

This invention relates to a clutch and it has to do particularly with the construction of a clutch driven member.

Among the objects of the invention is the provision of a driven clutch member capable of efficient operation, yet one having a relatively low inertia and one in which a material saving of stock may be effected in its manufacture. Other objects will become apparent as the description progresses.

This application is a continuation in part of application Serial Number 485,678, filed October 1, 1930.

Fig. 1 is a plan view of a driven clutch member with part of the clutch facing material removed to illustrate the construction.

Fig. 2 is a sectional view taken substantially on line 2—2 of Fig. 1, also showing driving clutch parts.

Fig. 3 is a similar sectional view taken through part of the disk illustrating the same in clutch engaging position.

Fig. 4 is a view similar to Fig. 3 showing a modified form.

Fig. 5 shows the construction of Fig. 4 in clutch engaged position.

Fig. 6 is a view showing in side elevation one side of a modified form of clutch construction.

Fig. 7 is a view of the opposite side of the form shown in Fig. 6.

Figs. 8 and 9 are sectional views of further modified forms.

Figs. 10 and 11 are side elevational views of parts of the driven disks constructed as shown in Figs. 8 and 9.

The driven member of a clutch as shown herein, is one designed to be packed in between driving members and it comprises a hub 1 which may be secured to a driven shaft (not shown) by the usual spline connection. This hub is provided with a flange 2. The major portion of the driven member preferably comprises separate metal pieces attached to the flange. These take the form of radially extending spoke-like members 3. The inner ends are cut or beveled off, as at 4, so that a multiplicity of the spokes may be nested after the manner shown in Fig. 1. These members preferably are arranged in pairs, one of each pair being disposed on opposite sides of the flange 2, and both may be secured to the flange by rivets 5.

These spoke members are of steel and are preferably straight, and the steel stock is such as to give to the spokes the requisite degree of springiness. Facing material 6 is carried at the outer periphery of the driven member, there being facing material on each side of the driven member, as shown in Figs. 2 and 3. The facing material is secured to the disk preferably by means of rivets 7 taken through both sections of the facing material and through aligned apertures 8 in the spoke members. The rivets 7 are applied with sufficient tightness to draw the opposite spoke members together so that they make substantial contact at their outermost edges, as shown in Fig. 2. This results in spacing the inner peripheral edges of the facing material away from each other so that when the driving members 9 and 10 of the clutch are pressed toward each other to pack the driven member between them, the first contact is made at the inner peripheral edge, substantially, as at 11. As the driven members move toward each other the spokes are flexed after the manner illustrated in Fig. 3, and in final clutch engaged position substantially the entire area of clutch facing material contacts with the driving members. This construction gives a nicety of clutch action by reason of a gradual increase of engaging area from the time clutch engagement starts until the clutch is completely engaged. The spoke members 3 being normally spaced apart are placed somewhat under tension when the rivet 7 is secured to fasten the facings thereto.

A modified form of spoke is shown in Figs. 4 and 5. Here each spoke instead of being normally straight is preformed so that a pair of spokes converge from the flange 2 substantially to point 15, then slightly diverge or extend spaced relative to each other from point 15 to about point 16 where they meet as at 17. This construction also spaces the inner peripheral edges of the facing material and when the driving members pack the driven member between them the spokes are flexed; the first point of contact between the spokes is substantially at the point 15, the space between points 15 and 16 still remaining slightly open, and on continued movement of the members 9 and 10 toward each other the leg portions of the spokes between the points 15 and 16 are substantially straightened out until they appear substantially as shown in Fig. 5 in full clutch engaged position.

Instead of making the spoke members out of separate pieces a clutch driven part can be made a single member, as illustrated at 17 (Fig. 7), wherein the spokes are integral with the central portion. A member such as this may be stamped out from a single blank of metal. The driven member of a clutch may be made up of two of such one-piece members with their hub portions secured to opposite sides of the hub flange, or if desired, the member may be made up of a combination of these arrangements wherein one side, as shown in Fig. 6, comprises the separate spokes, and the other side comprises the integral spoke members stamped from a single sheet of metal.

There is a substantially negligible waste of metal in a clutch member constructed with these separate spoke portions. The spokes may be made from strip stock and the only waste comes about by reason of the openings provided for the rivets and the cutting off of the inner ends where they nest together. This represents a material saving of stock over the practice of stamping disk members from sheet steel stock, for even where a round disk is stamped from a square blank there is a large waste of metal, to say nothing of the waste due to the forming of spokes and cutting out the center, etc. Moreover, the circumferential spacing between the spokes is preferably not great, and in fact the space between the spokes at about the position of the inner edge of the facing material is such as to substantially effect a continuous underlying support for the facing material at this point. In other words, the spacing is such that the facing material readily bridges the same with substantially no tendency to collapse between spokes.

Moreover, the inertia of the driven member is reduced because there is no mass of weight near the peripheral edge of the driven member. This is true of a construction where the spokes and center portion are integral, and made from a single blank, although this form does not effect a saving of material. It is feasible that the flexing action of the spokes in clutch engagement and disengagement may be varied; this may be done by effecting variation in the thickness of stock of which the spokes are made, or by varying the width of the hub flange, or both.

The modified forms shown in Figs. 8 and 9 are similar, the one shown in Fig. 8 having a spoked one-piece disk 20 secured to the hub flange, and separate spoke members 21 are secured to the disk by rivets, as shown, and spaced therefrom by filler or spacer element 22. This spaces the disk spokes and separate spokes, and they may be drawn together at their outer edges by the rivets holding the clutch facing material. In Fig. 9 instead of using the filler or spacer element the spokes 23 are offset, as at 24.

This construction in a clutch driven member affords provision for obtaining differential effective packing pressures across the contacting faces of driving and driven members which may be calculated to produce substantially uniform torque capacity across the contacting faces. To exemplify this the following formula may be given:

$$T = P \times R \times N \times F$$

In this formula T is used as representative of torque capacity, P the pressure, R the radius, N the number of disks, and F the coefficient of friction.

A clutch may employ one or a plurality of driven disks, but this is a known constant; also with a given type of facing material the coefficient of friction is constant. It follows that for exemplification purposes N and F may be disregarded; accordingly, disregarding the constants the formula $-T = P \times R-$ may be used.

By referring to Figs. 2 and 3 it will be noted that the reference character A is applied to the inner peripheral edge of the facing material and B to the outer peripheral edge. The radius at A being shorter than the radius at B it follows that a greater pressure is required at A than at B in order that the torque capacity be the same or substantially the same. The construction lends itself to the provision of greater pressure at A than at B with a progressive decrease in pressure from A to B in such wise that the torque capacity across the facing may be substantially uniform. A substantially ideal condition may exist wherein the differential pressure varies as regards the radius so that on any arc taken around the center of the disk and within the points A and B, $P \times R =$ substantially a uniform T, or torque capacity.

Of course the torque capacity of a given clutch may vary as desired, the principal variation coming about by reason of weight and size of the vehicle, or in other words, the amount of power to be transmitted and the size or power of the engine. One specific example may be given as follows: Assume that at point B a pressure of 720 pounds at that radius gives the desired torque capacity. Assume that at point A on a shorter radius a pressure of 1200 pounds is required to give the same torque capacity, or substantially the same; there is accordingly a differential of 480 pounds. The disk as shown in the drawings, especially Fig. 1, shows twelve spokes; thus the 480 pounds differential is carried by the twelve spokes which means that each spoke should carry or provide 40 pounds additional pressure at point A.

The various elements which enter into the clutch construction may be calculated to produce these results and the length of the spokes, the material of which they are made, the thickness and width of the stock may all be calculated so that a force of 40 pounds is required to hold the spokes distorted in full clutch engagement such as shown in Fig. 3. The same calculation can be made as regards the forms of the invention shown in Figs. 4, 5, 8 and 9 and also with a disk having integral spokes such as shown in Fig. 7.

It is to be noted that the spokes are what may be termed in the nature of beams in that they are supported on opposite sides of the stress or strain placed upon them by clutch engagement. In other words, the spokes are supported at their outer and inner ends; the stress or strain upon the spokes at the point B is zero or substantially zero because at this point there is only a compression action, while at their inner parts they are effectively spaced apart so that a bending action takes place between these two points.

Accordingly, with this type of support the spokes may be made of stock sufficiently light so as to provide a driven disk of adequately low polar inertia. To clarify this point it may be pointed out that if the spokes were supported cantilever fashion they would have to be of stock sufficiently thick to resist the packing pressure and furnish the desired torque capacity. This would increase the polar inertia. With the present case there is no strain on the spokes at point B and while 1200 pounds packing pressure in the example given may be applied at point A, yet the spokes do not provide for this 1200 pounds pressure but merely afford the differential of 480 pounds which in a twelve spoke disk is 40 pounds per spoke which can be provided with relatively thin stock. In some of the claims appended hereto it is said that the driven member comprises spokes, or language to this equivalent, and this is intended to cover both a member made up of separate spokes and a member having integral spokes.

I claim:

1. A clutch driven member comprising two sets of spokes spaced axially and arranged in pairs, facing material near the outer ends of the spokes and over the outer sides of each set of spokes, and means passing through the facing material and the pairs of spokes for holding the facing material in place and drawing the spokes together near their outer edges.

2. A clutch driven member comprising a hub with a flange, a set of normally straight spokes secured to one side of the flange, another set of normally straight spokes secured to the other side of the flange, facing material overlying the outer sides of both sets of spokes, and rivets passing therethrough for drawing the spaced spokes together and holding the facing material in place.

3. A clutch driven member comprising a hub with a flange, a set of normally straight spokes secured to one side of the flange, another set of normally straight spokes secured to the other side of the flange, the spokes of the sets being arranged in pairs, two pieces of facing material near the outer periphery on the outside of the spokes, and a rivet passing through the facing material and each pair of spokes for holding the facing material in place and drawing the spokes together.

4. A driven member for a clutch comprising a hub with a flange, a plurality of strip metal spokes having their inner ends nested upon one side of the flange and secured thereto, a plurality of strip metal spokes having their inner ends nested on the other side of the flange and secured thereto, two pieces of facing material near the outer ends of the spokes with the spokes between the facing material, and rivets passing through the facing material and spokes and holding the outer ends of the spokes substantially in a common plane.

5. A driven member for a clutch comprising a hub with a flange, a plurality of strip metal spokes having their inner ends nested upon one side of the flange and secured thereto, a plurality of strip metal spokes having their inner ends nested on the other side of the flange and secured thereto, two pieces of facing material near the outer ends of the spokes with the spokes between the facing material, and rivets passing through the facing material and spokes, said spokes being normally straight and spaced apart, and said rivets serving to draw their outer ends together.

6. A clutch driven member comprising a hub with a flange, a plurality of strip metal spokes having their inner ends nested on one side of the flange and secured thereto, a one-piece disk member having integral radially extending spokes and a central portion secured to the other side of the hub flange, facing material over each set of spokes near their outer ends, and rivets passing through the spokes and facing material.

7. A clutch driven member comprising a hub with a flange, a plurality of strip metal spokes having their inner ends nested on one side of the flange and secured thereto, a one-piece disk member having integral radially extending spokes and a central portion secured to the other side of the hub flange, facing material over each set of spokes near their outer ends, and rivets passing through the spokes and facing material, the plurality of spokes and spokes on the disk being arranged in axially aligned pairs, and each of said rivets passing through a pair of spokes.

8. A clutch driven member comprising a hub with a flange, a plurality of strip metal spokes having their inner ends nested on one side of the flange and secured thereto, a one-piece disk member having integral radially extending spokes and a central portion secured to the other side of the hub flange, facing material over each set of spokes near their outer ends, and rivets passing through the spokes and facing material, the plurality of spokes and spokes on the disk being arranged in axially aligned pairs and spaced apart, and each of said rivets passing through a pair of spokes serving to draw them together at their outer ends.

9. A clutch driven member comprising a hub and a flange, a plurality of radially extending spokes secured to opposite sides of the flange and arranged in axially spaced pairs, said spokes being shaped so that the two spokes of a pair converge away from the flange, then extend in spaced relation and substantially abut near their ends, facing material on opposite outside faces of the spokes, rivets passing through the facing material and spokes, said spokes being adapted to be flexed toward each other as the facing material is packed between clutch driving members.

10. A clutch driven member comprising a hub, spoke members projecting therefrom arranged in axially aligned pairs and normally spaced apart, facing material on each side of the spoke members, and means passing through the facing material and spoke members for holding the facing material thereto and drawing the spoke members substantially together at their outer ends.

11. A clutch driven member comprising a hub, spoke members projecting outwardly therefrom arranged in axially spaced radially aligned pairs, said spoke members being normally spaced apart for a distance and substantially contacting at their outer ends, and means for securing clutch facing material on each side of the spoke members.

12. A clutch driven member comprising a hub with a flange, a one-piece disk member having integral radially extending spokes and the central portion secured to said flange, separate strip metal spokes held in paired relation to the spokes on the disk and normally spaced therefrom, facing material over the spokes on the disk and separate spokes, and means holding the facing material in place and holding the separated paired spokes substantially together at their outer ends.

13. A clutch driven member comprising a hub with a flange, a disk having a central portion secured to the flange and integral spokes, a plurality of separate spoke members each secured to the disk near the central portion and being paired with the spokes on the disk and normally spaced therefrom, two pieces of facing material separated by the paired spokes, and means securing the facing material to the spokes and holding the paired spokes substantially in contact at their outer ends.

14. A clutch member comprising a plurality of radially extending spokes, some of which are axially spaced apart, facing material on opposite sides of the spokes held spaced apart by said axially spaced spokes and adapted to be packed between other clutch members, means for holding the ends of the spokes substantially in a common plane whereby the spokes converge outwardly, said axially spaced spokes being flexed under packing pressure to produce varying pressure across the facing material, the flexing action of the spokes being calculated to produce such varying pressures as to give substantially equal torque capacity across the facings.

15. A clutch driven member adapted to be packed between clutch driving members, comprising a hub having a flange, radially extending spokes on opposite sides of the flange, two facing elements carried by the outer ends of the spokes and on opposite sides thereof, means securing the facings to the spokes and also serving to hold the outer extremities of the spokes in close proximity whereby the spokes diverge toward the flange, said diverging spokes holding the facings spaced apart at the inner parts of the facing, said spokes being adapted to be flexed toward each other under packing pressure.

16. A clutch driven member adapted to be packed between clutch driving members comprising, a hub having a flange, radially extending spokes on opposite sides of the flange, two facing elements carried by the outer ends of the spokes and on opposite sides thereof, means securing the facings to the spokes and also serving to hold the outer extremities of the spokes in close proximity whereby the spokes diverge toward the flange, said diverging spokes holding the facings spaced apart at the inner parts of the facing, said spokes being adapted to be flexed toward each other under packing pressure, the flexure of the spokes being calculated to produce unequal pressure across the surface of the facings with the pressure progressively diminishing from the inner to the outer facing boundaries such that the torque capacity at substantially any point bebetween the inner and outer boundaries is substantially constant.

17. A clutch driven member adapted to be packed between clutch driving members comprising a disk formed of two sets of spokes, the sets of spokes being axially spaced apart near the center of the disk and extending radially outward in converging relation with their ends lying approximately in a common plane, two rings of facing material one attached to each side of the spokes and held spaced apart at their inner edges by the spaced spokes, means for holding the ends of the spokes in said common plane, said spokes being flexed toward each other when the driven member is packed between driving members, the said spokes being calculated as to flexure to produce progressively diminishing packing pressure from the inner edge of the facings to the outer edge whereby the decreasing pressure corresponds to the increasing radius so that substantially a uniform torque capacity is maintained across the clutch facings.

18. A clutch driven member adapted to be packed between clutch driving members comprising a disk formed of two sets of spokes having free ends, the sets of spokes being axially spaced apart near the center of the disk and extending radially outward in converging relation with their ends lying approximately in a common pane, two rings of facing material one attached to each side of the spokes and held spaced apart at their inner edges by the spaced spokes, means for holding the ends of the spokes in said common plane, said spokes being flexed toward each other when the driven member is packed between driving members, the said spokes being calculated as to flexure to produce progressively diminishing packing pressure from the inner edge of the facings to the outer edge whereby the decreasing pressure corresponds to the increasing radius so that substantially a uniform torque capacity is maintained across the clutch facings.

19. A clutch driven member adapted to be packed between driving members comprising spokes diverging from their outer ends toward the center of the member to axially spaced relation, means for holding the outer ends of the spokes substantially in a common plane, a ring of facing material on each side of the spokes substantially immovable toward each other at the extreme edge of the spokes and movable toward each other by spoke flexure at the inner edge of the facing rings, the flexure of the spokes being calculated to produce unequal pressures across the clutch facing whereby at any point within the inner and outer boundaries of the clutch facings the packing pressure times the radius equals substantially the same torque capacity.

20. A driven clutch member adapted to be packed between driving clutch members comprising spokes diverging from the outer ends toward the center of the driven member, a ring of clutch facing material on opposite sides of the spokes, means securing the facing rings and the outer ends of the spokes together, said spokes flexing under packing pressure and the flexure thereof calculated so that a differential pressure across the clutch facing is produced which substantially corresponds to the varying radii, whereby the radius and pressure at substantially any given point between the inner and outer boundaries of the facing effects a torque capacity substantially equal to the torque capacity at any other point within the inner and outer boundaries of the facing.

21. A clutch driven member adapted to be packed between clutch driving members comprising a hub with a flange, spoke means secured to one side of the flange with the spokes extending radially outwardly and having free ends, spoke means attached to the other side of the flange with the spokes extending radially outward and having free ends, a ring of facing material on opposite sides of the spokes near their outer free ends, means connecting the rings of facing material for holding the free ends of the spokes in close proximity with the spokes diverging substantially from their outer ends to the flange and serving to hold the inner edges of the facing rings normally spaced apart, said spokes flexing toward each other under packing pressure whereby an effective packing pressure at the inner edges of the facing is greater than the effective packing pressure at the outer edges with the differential effected by the force required to flex said spokes, said spokes being calculated as to flexure so that packing pressure of the small radius at the inner edges of the facings and the packing pressure at the long radius at the outer edges of the facings produces substantially equal torque capacity.

22. A clutch driven member adapted to be packed between clutch driving members comprising a hub with a flange, spoke means secured to one side of the flange with the spokes extending radially outwardly and having free ends, spoke means attached to the other side of the flange with the spokes extending radially outward and having free ends, a ring of facing material on opposite sides of the spokes near their outer free ends, said spokes being arranged in aligned pairs, and means passing through the facings and pairs of spokes for holding the free ends of the spokes in close proximity with the spokes diverging substantially from their outer ends to the flange and serving to hold the inner edges of the facing rings normally spaced apart, said spokes flexing toward each other under packing pressure whereby an effective packing pressure at the inner edges of the facing is greater than the effective packing pressure at the outer edges with the differential effected by the force required to flex said spokes, said spokes being calculated as to flexure so that the packing pressure on the small radius at the inner edges of the facings and the packing pressure on the long radius at the outer edges of the facings produces substantially equal torque capacity.

23. A clutch driven member adapted to be packed between clutch driving members, comprising radial spokes spaced axially near the center of the member and converging toward their outer extremities, facing material on opposite sides of the spokes held spaced apart at the inner peripheral edges of the facing material by said spokes, means securing the facing material and the outer parts of the spokes together, said spokes being flexed toward each other under packing pressure to produce greater effective packing pressure at the inner edges of the facings than at the outer edges, the flexure of the spokes being calculated so that the effective packing pressure at the inner peripheral edges of the facing material produces a torque capacity substantially the same as the torque capacity produced at the outer peripheral edges of the facing material by the lesser packing pressure.

24. A clutch driven member adapted to be packed between driving members comprising a disk like member having parts extending in diverging relation substantially from the peripheral edge toward the center, facing material over opposite sides of said member held spaced apart by the diverging parts, means securing the facing material and the outer portions of the disk like member together, said parts being flexed toward each other when the driven member is packed between driving members, and said parts being calculated as to flexure so as to produce differential effective packing pressures across the faces of the said facing material which vary in substantially uniform manner as regards the varying radii, whereby the torque capacity across the facing material is substantially uniform.

25. A clutch driven member adapted to be packed between driving members, comprising a hub, a flange on the hub, parts secured to the hub and on opposite sides of the flange extending from the flange substantially to the outer periphery of the member in converging relation, means holding the outer portions of said parts substantially in a common plane, two rings of facing material near the outer periphery of the member, one on each side of the member and held spaced apart by said converging parts at their inner peripheral edge, said converging parts being flexed toward each other when the driven member is packed between driving members, and said converging parts being calculated as to flexure to produce varying effective packing pressures across the faces of the rings with the greater pressure at the inner peripheral edge and the lesser pressure at the outer peripheral edge with the pressures progressively decreasing from inner to outer edges substantially in accordance with the increasing radii whereby the torque capacity across the rings of facing material is substantially uniform.

26. The combination in a clutch, of driving members, a driven member adapted to be packed between the driving members, said driven member comprising a disk like body having spokes extending in diverging relation substantially from the peripheral edge toward the center, means for holding the outer ends of the spokes substantially in a common plane, a ring of facing material on each side of the driven member near its outer periphery with said rings being held spaced apart at their inner peripheral edges by said diverging spokes; said diverging spokes being flexed toward each other when the driven member is packed between the driving members and being calculated as to flexure whereby to produce progressively diminishing effective packing pressures across the rings of facing material from their inner peripheral edge to their outer peripheral edge with the said pressures varying in accordance with the increasing radii to effect substantially uniform torque capacity across the rings of facing material.

27. A clutch driven disk comprising a disk body having spoke like members extending from near the center of the disk to the outer peripheral edge thereof, some of said spoke like members having their base portions which are located relatively near the center of the disk disposed axially removed to one side of the normal plane of the disk, some of said spoke like members having their base portions disposed axially removed to the opposite side of the normal plane of the disk whereby the base portions of said spoke like members are axially spaced apart, a ring of clutch facing material disposed over the outside faces of said spoke like members near their outer periphery, and securing means connecting the rings of facing material and serving to hold the outer ends of said spoke like members substantially in the normal plane of the disk whereby said spoke like members diverge from their outer ends toward the center of the disk to maintain the inner peripheral edges of the rings of facing material normally spaced apart.

28. A clutch driven disk comprising a disk body having spoke like members extending from near the center of the disk to the outer peripheral edge thereof, some of said spoke like members having their base portions which are located relatively near the center of the disk disposed axially removed to one side of the normal plane of the disk, some of said spoke like members having their base portions disposed axially removed to the opposite side of the normal plane of the disk whereby the base portions of said spoke like members are axially spaced apart, a ring of clutch facing material disposed over the outside faces of said spoke like members near their outer periphery, and securing means connecting the rings of facing material and serving to hold the outer ends of said spoke like members substantially in the normal plane of the disk whereby said spoke like members diverge from their outer ends toward the center of the disk to maintain the inner peripheral edges of the rings of facing material normally spaced apart, the extreme outer ends of the spoke like members serving to substantially rigidly space the outer peripheral edges of the rings of facing material apart, and said diverging spoke like members being adapted to flex toward each other under packing pressure.

29. A clutch driven disk comprising a hub having a flange, spokes secured to one side of the flange, spokes secured to the other side of the flange, said spokes extending substantially radially outwardly in axially spaced relation, the ring of facing material over the outside faces of the two sets of spokes near their outer edges, means connecting the rings of facing material serving to secure said rings to the spokes with the spokes disposed between the rings of facing material, said securing means holding the rings of facing material substantially together with the spoke ends disposed between them whereby the sets of spokes diverge from their outer ends toward the hub and maintain the inner peripheral edges of the rings of facing material normally axially spaced apart, said spokes being adapted to flex toward each other under packing pressure.

30. In a friction disc a plurality of fingers disposed in planes converging toward the outer ends of the fingers, and friction facings secured on the outer zones of said fingers.

31. In a friction disc having a rigid hub portion and a pair of annular clutch facings at its outer zones, means for resiliently supporting said facings and maintaining them normally at an angle to each other, comprising laterally spaced sets of radiating spring arms fastened to the hub and each set engaging the inner surface of one of the clutch facings, and circumferentially spaced fastening members securing the clutch facings to the spring arms, said fastening members being arranged adjacent the outer peripheries of the clutch facings and holding the clutch facings and spring arms together in non-spaced relation at the outer periphery of the facings.

32. In a disc-type clutch member having a rigid hub portion, a pair of annular clutch facings at its periphery, an intermediate support for the clutch facings including laterally spaced resilient arms engaging the inner surfaces of the clutch facings, and a series of circumferentially spaced fastening members passing through certain of the spring arms and both clutch facings adjacent their outer peripheries, and which draw the outer peripheral portions of the clutch facings toward each other, said resilient arms normally pressing the inner peripheral portions of the clutch facings away from each other.

33. The combination with pressure members, of a friction disc, a plurality of resilient arms on the disc in spaced planes, a friction facing on each side of the arms, a plurality of fastening elements for securing the facings to the resilient arms and to bend the said resilient arms toward each other so as to bring the facings closer to each other at one periphery, and hold them resiliently spaced at the other peripheries thereof, until engaged by said pressure member.

ERNEST E. WEMP.